US005452001A

United States Patent [19]
Hosier et al.

[11] Patent Number: 5,452,001
[45] Date of Patent: Sep. 19, 1995

[54] SERIAL PIXEL READOUT SCHEME FOR BUTTED SENSOR CHIPS IN MULTI-CHIP INPUT SCANNER

[75] Inventors: Paul A. Hosier, Rochester; Scott L. Tewinkle, Ontario, both of N.Y.

[73] Assignee: Xerox Corporation, Stamford, Conn.

[21] Appl. No.: 139,659

[22] Filed: Oct. 22, 1993

[51] Int. Cl.⁶ ............................................. H04N 5/335
[52] U.S. Cl. ........................... 348/230; 348/302; 348/303; 348/312
[58] Field of Search ............... 348/294, 295, 311, 324, 348/302, 303, 308, 312, 230, 297–299; 358/482, 483, 513, 514, 494, 486; 250/208.1; 382/65, 67; 327/408, 409

[56] References Cited

U.S. PATENT DOCUMENTS

| | | | |
|---|---|---|---|
| 4,228,465 | 10/1980 | Stone et al. | 358/166 |
| 4,553,169 | 11/1985 | Yoshioka et al. | 348/691 |
| 4,556,908 | 12/1985 | Ida | 348/302 |
| 4,581,650 | 4/1986 | Masafumi et al. | 348/304 |
| 4,706,123 | 11/1987 | Chautemps | 348/297 |
| 4,734,772 | 3/1988 | Akiyama | 348/311 |
| 4,999,484 | 3/1991 | Kaneko | 348/294 |
| 5,027,226 | 6/1992 | Nagata et al. | 348/294 |
| 5,109,940 | 4/1992 | Kawahara et al. | 348/294 |
| 5,184,006 | 2/1993 | Ueno | 348/312 |
| 5,198,654 | 3/1993 | Mukainakano et al. | 348/294 |
| 5,216,493 | 6/1993 | DiBella et al. | 358/29 |
| 5,268,765 | 12/1993 | Yamashita | 348/294 |
| 5,280,304 | 1/1994 | Sato et al. | 348/294 |

Primary Examiner—Joseph Mancuso
Assistant Examiner—Bipin Shalwala
Attorney, Agent, or Firm—R. Hutter

[57] ABSTRACT

A raster input scanner comprises a linear array of photosensors arranged on a plurality of butted chips. The analog video signal from the first photosensor on each chip is read out for an extended period relative to the readout of the other photosensors on the chip, to provide extra settling time for the signal.

14 Claims, 5 Drawing Sheets

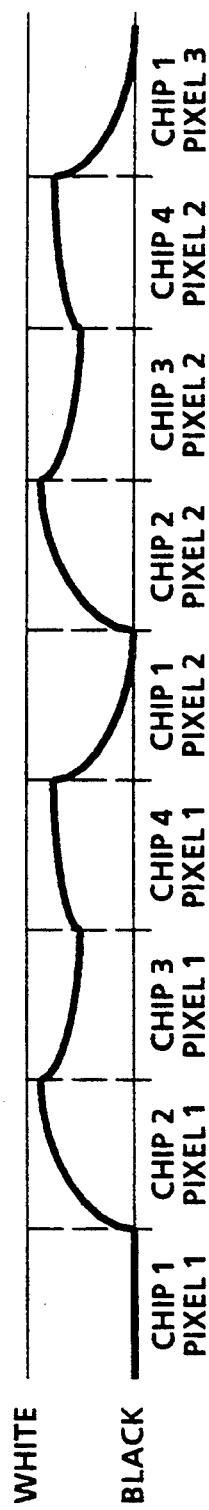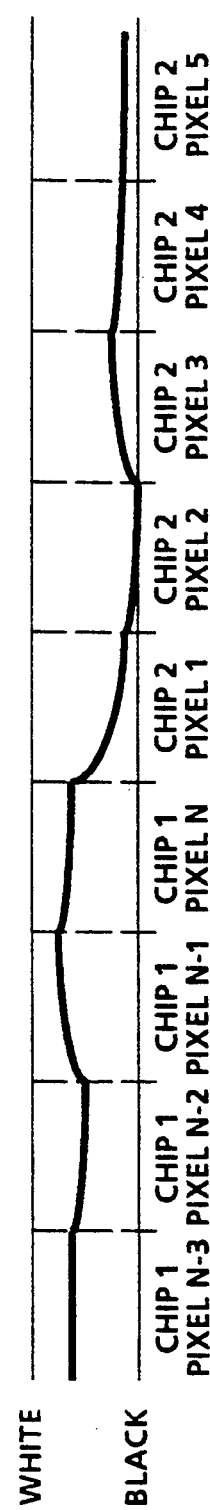
FIG. 2
FIG. 3

SERIAL PIXEL READOUT SCHEME FOR BUTTED SENSOR CHIPS IN MULTI-CHIP INPUT SCANNER

The present invention relates to image sensor arrays used in raster input scanners.

Image sensor arrays typically comprise a linear array of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, a preferred design includes an array of photosensors of a width comparable to the width of a page being scanned, to permit one-to-one imaging generally without the use of reductive optics. In order to provide such a "full-width" array, however, relatively large silicon structures must be used to define the large number of photosensors. A preferred technique to create such a large array is to make the array out of several butted silicon chips. In one proposed design, an array is intended to be made of 20 silicon chips, butted end-to-end, each chip having 248 active photosensors spaced at 400 photosensors per inch. Typically, the chips which are butted to form the array are formed in a circular silicon wafer, which is then "diced" into a number of chips, which are individually tested and then arranged into a bar shape.

When the individual silicon chips are butted to form a single linear array of photosensors, several practical problems must be taken into consideration. One key problem, for example, involves ensuring consistent spacing between the end photosensors of adjacent chips, which should be spaced from each other at a distance equal to adjacent photosensors within each chip. Another key practical problem, which is intended to be addressed by the present invention, stems from the fact that each individual chip in a full-width array in many ways acts as an independent circuit, the precise outputs of which may not be necessarily consistent with the outputs of other chips forming an entire system. Specifically, no matter what particular multiplexing scheme is used to read out the various signals from each photosensor in each array, the analog video output will be dependent on the particular characteristics of each individual chip. Some chips may be of a consistently higher voltage in their outputs than others. When the signals from a plurality of chips are collected and recombined to form an image, the areas of the image which were read by particular chips, or at positions corresponding to chip boundaries, may be slightly darker or lighter than they should be because of this chip-to-chip nonuniformity.

Although most scanning systems currently in use are ultimately digital systems, the "raw signal" coming out of the photosensors during the scanning process is an analog video signal. Thus, when signals are read out from the photosensors on a chip to be converted to digital data, different video levels (corresponding, generally, to the brightness of the reflected area being scanned by a particular photosensor at a particular moment) must "settle" from photosensor to photosensor with a changing signal. In a typical practical system for reading out the video signals, this readout time for real-time scanning is approximately 50 nanoseconds per photosensor. When the outputs of a plurality of photosensors are read out serially, certain time must be allowed between each photosensor reading to allow the reading to "settle" to the actual value of a signal corresponding to the light impinging on the photosensor. If the readout is too fast (i.e., if the sampling time from the photosensor is too short), the system will have moved on to the next photosensor before a particular photosensor has been given time to settle to its actual value, with the result that distortions in the ultimate digital readings based on the analog signals will occur.

For scanning systems in which there is only one chip involved, such as with a CCD chip having reductive optics, the distortions caused by insufficient settling time between pixel readouts are not quite as crucial. Typically, photosensors are read out in the order corresponding to their position on the chip, so that distortions occur only between adjacent pixel areas in the original image. Even if one pixel in an original image is entirely black and the immediate adjacent pixel is entirely white, as in at the edge of a character in text, it has been found that the eye is generally incapable of detecting the distortions on a printed document caused by insufficient settling time if the transition across the document from black to white is "in context."

However, if a plurality of photosensor chips are butted across the width of a page being scanned, the black-to-white transitions between adjacent photosensors on adjacent chips will not always be "in context." In such multi-chip systems, the various photosensors are read out serially in cycles from each chip individually, so that the last photosensor read out at one end of a given chip is followed by the readout of the first pixel on that chip, i.e., to a photosensor which is not directly next to the last photosensor to be read out. Alternately, the photosensors may be read out in parallel form, i.e. a photosensor in position x on chip y will be followed in the readout by a photosensor in position x on chip y+1, etc. Thus, with a multi-chip system, all of the photosensors collectively are not necessarily read out in the order on which they are disposed relative to the image; rather there are "jumps" between the positions of various photosensors as they are read out. This "jump" negates the effect of the "in context" smoothing of pixel-to-pixel distortions. What may result is anomalies such as streaks in a finished image at the abutment point of chips in the scanning array, particularly if there are uniform gray areas in the original image. Another type of anomaly that is likely to appear in an image recorded with parallel-readout system is "ghosting," which occurs when a white area of an image is "jumped" to from a darker portion of the image, and recordation occurs before the system has had time to adjust from the dark signal to the light: the cumulative effect of many of these jumps is that a "ghost" image, meaning an artifact which looks like the dark portions of the original, will appear on a lighter area of the recorded image, displaced by the width of one chip.

Compounding the problem of nonuniformities between photosensors is the fact that many preferred designs of individual chips in full-width scanning arrays include "dark" photosensors, which are used to periodically reset the offset voltage for the photosensors. These dark photosensors are of the same semiconductor structure as the other "active" photosensors on each chip, but the dark photosensors are not exposed to light. Typically, in the scanning process, with each cycle of readout of photosensors on each chip, the readout of the first photosensor is preceded by readouts of one or more dark photosensors, which are used to reset the voltage offset associated with the chip and thereby correct signal drift. However, these "dark pixel" photosensors may exacerbate the problems of chip-to-chip nonuniformity in multi-chip, full-width scanning arrays.

U.S. Pat. No. 4,228,465 discloses one system for taking into account certain types of nonuniformities in adjacent photosensors outputting analog video waveforms. For each pixel signal passing through the system, the values of adjacent pixels in two dimensions are taken into account by multiplying the pixel signals which are next to the pixel of interest by a correction factor, and then adding or subtracting the result from the pixel of interest to yield a pure signal representing true picture information only.

U.S. Pat. No. 5,216,493 discloses another system for correcting analog video signals, particularly as relating to "white balance" in a color system. Three color channels are balanced by measuring relative output between color channels at many different illumination levels, and then deriving a correction table which is stored in an electronic look-up table.

According to the present invention, there is provided a method of reading out signals from a set of active photosensors to a channel in a raster input scanner. For most active photosensors in the set, signals are transferred from the active photosensor to the channel for a pretedetermined regular readout period. For a first active photosensor in the set, an extended readout period for transferring a signal from the first active photosensor is provided, the extended readout period being substantially longer than the regular readout period.

In the drawings:

FIG. 1 is a plan view of a portion of a linear array of photosensors arranged on a plurality of butted silicon chips;

FIGS. 2, 3, and 4 are, respectively, sets of examplary waveforms for video output signals according to a number of pixel readout schemes in the prior art;

Figure 7:
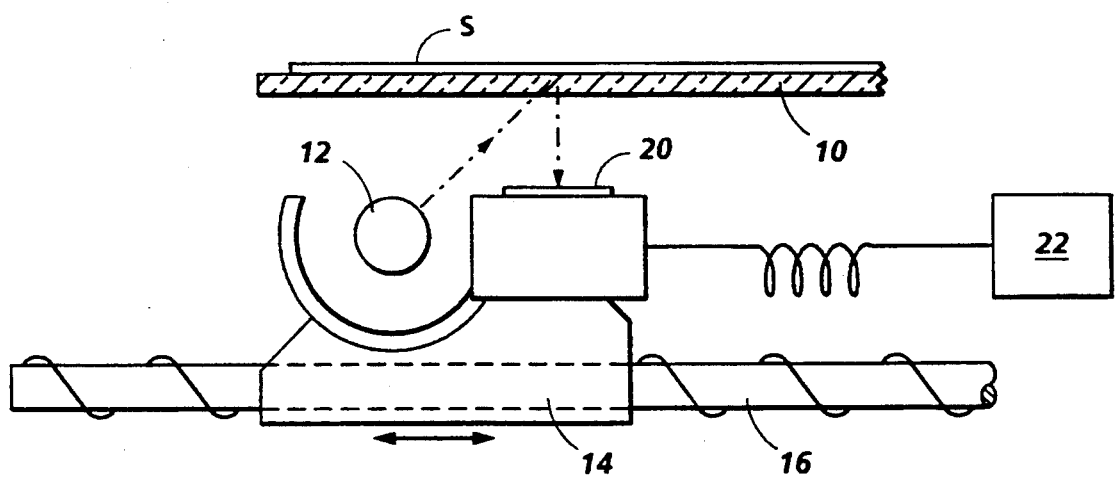
FIG. 7 shows an elevational view, partially in section, of a prior-art raster input scanner that incorporates the present invention therein.

Referring initially to FIG. 7, an image to be scanned from a sheet S is placed on a transparent platen 10. From the other side of the platen 10, the image is illuminated by a lamp 12 which is conveyed by a reciprocating shuttle 14, which causes the lamp 12 to be moved, or scanned, relative to the sheet S. The shuttle 14 may be caused to move by any number of possible means, such as the rotatable screw 16 shown, or any other arrangement known in the art. Also mounted on shuttle 14 is, in this particular embodiment, a full-width photosensor array 20 which moves with the lamp 12, and which serves to receive the light from lamp 12 which is reflected from the image on sheet S. The array 20 is operatively connected, by serial or parallel means or a combination of such means, to an image processing system here shown schematically and indicated as 22. Image processing system 22 is generally in the form of a computer capable of converting the analog voltage outputs from the photosensor array 20 to a stream of digital gray-scale levels, performing various functions on these gray-scale levels, and organizing the signals to image data usable elsewhere, such as in a digital printer.

Figure 1:
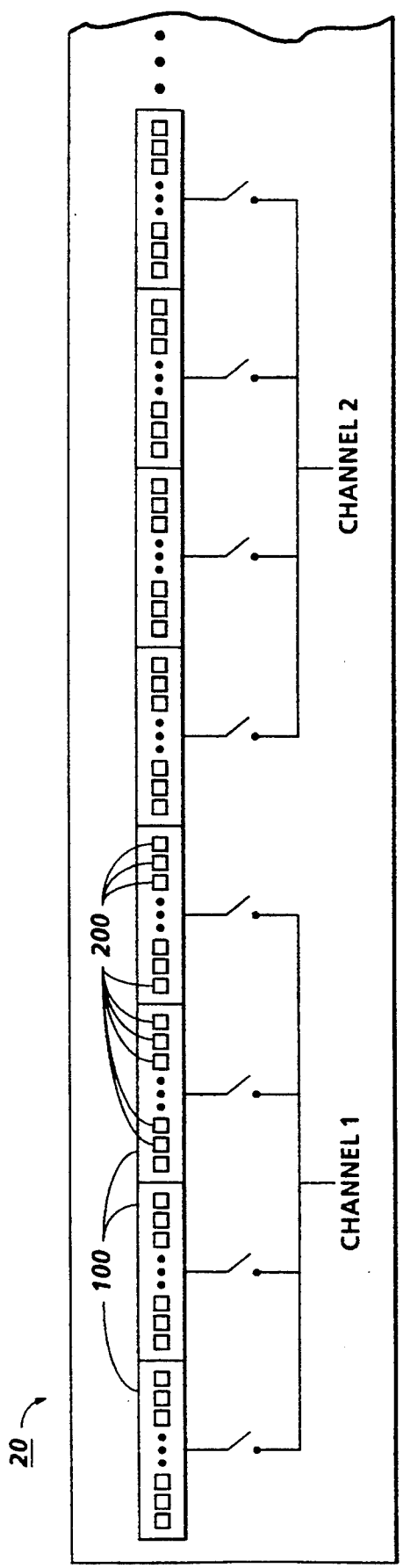

FIG. 1 is a simplified plan view of a typical configuration of a full-width scanning array with a plurality of butted chips. There is shown a plurality of chips, each labeled 100, each chip 100 further comprising a linear array of photosensors here shown in each case as 200. The photosensors 200 are arranged in a linear array on each chip 100, and when a plurality of chips 100 are arranged in a single bar, the photosensors 200 together form a single long array 20 of photosensors. In FIG. 1, certain sets of chips along the linear array are arranged into distinct "channels" as shown, each set of four adjacent chips 100 ultimately sending signals to one channel, several channels being provided in a single linear array. In this system the readouts into each channel can be "serial" (i.e., readout the photosensors in order on the first chip and then all of the photosensors on the second chip, etc.) or "parallel" (i.e., first pixel from the first chip, first pixel from the second chip . . . second pixel from first chip, second pixel from second chip, etc.). Either way, there is a risk of certain chip-to-chip nonuniformities associated with each system.

Figure 4:
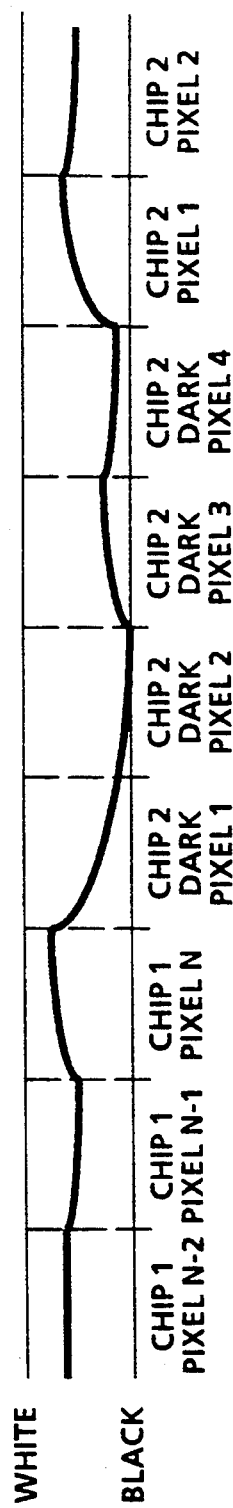

FIGS. 2, 3, and 4 represent respective example waveforms corresponding to output signals from photosensors in the array 20 as they are read out through one channel. As can be seen in the x-axis of the graph of FIG. 2, FIG. 2 shows an example waveform for parallel chip output for a 4-chip channel. Generally speaking, the "higher" the waveform is, the "brighter" the signal for the photosensor for that particular pixel being scanned. Significantly, the waveform changes from photosensor to photosensor are asymptotic in shape. That is, with each transition from one photosensor to the next, an abrupt change in the direction of the output can be seen, and following each abrupt change the waveform is intended to gradually "settle" to a final value. What is occurring, of course, is that the analog system is adapting to sudden changes in input which occur with abrupt shifts from photosensor to photosensor. As is clear from the waveform of FIG. 2, a certain finite time is required for the "final" value of each photosensor to be reached; it may appear, in fact, that the system has moved onto the next photosensor before the reading from the preceding photosensor is finally arrived at. However, as mentioned above, the timing for reading out each photosensor at readout is a design decision requiring a trade off between accuracy and speed.

As can be seen in the x-axis of the graph, FIG. 2 shows an example readout for a "parallel" system, in which the photosensors are read out such that the photosensor in position x on chip y is generally followed by the photosensor in position x on chip y+1. Because the photosensors are not being read out in the order on which they appear in the linear array, there is a chip-width "jump" between pixels in a given row being sampled on an image being recorded. These very abrupt, out-of-context jumps can occur from a full-black portion of the image to a full-white portion, or vice-versa. Such a full-black to full-white transition is shown here as occurring from chip 1-pixel 1 to chip 2-pixel 1: because the waveform must "travel" a fairly large "distance" to go from black to white, it is possible that the reading of chip 2-pixel 1 may not have settled to its "true" value before the system moves on to chip 3-pixel 1. A practical result of this insufficient settling, when the anomaly is repeated over several pixels, could be a "ghost," or artifact, from the recorded image associated with chip 2, displaced into the area recorded by chip 3.

FIG. 3 is a waveform for serial chip output through a channel. As can be seen by the x-axis of the graph, the photosensors are read out in such an order that the last photosensor in one chip is followed by the first-positioned photosensor in the next chip, so that the photosensors as a whole are read out in spatial order across the linear array for the width of the channel. Even though this system will generally eliminate the problems of out-of-context transitions between pixels, there will still exist a problem of chip-to-chip nonuniformity caused by the fact that each individual chip in an array functions to a large extent as an independent circuit, and the actual analog output from a set of chips will vary. So, if it is assumed that, in the example of FIG. 3, a uniform gray area is being observed, there may not only be pixel-to-pixel nonuniformity as shown in the chip 1 pixels, there may also be a systemic chip-to-chip nonuniformity at the transition between chip 1-pixel n to chip 2-pixel 1. Such a nonuniformity could cause a conspicuous light streak on an image at the chip boundary. (In this case, there will also be an "out-of-context" pixel problem at the boundary between adjacent channels, when the sampling of the last photosensor in the channel is followed in the readout by the first pixel in the channel, to begin a new cycle.)

FIG. 4 shows the chip-boundary effect which may occur when butted chips each have a set of "dark pixel" photosensors, which are generally designed to allow for a periodic reset of voltage offset within each chip. As shown, after the left pixel n of chip 1 is read out, the next signals in the series are coming from a series of four dark photosensors on chip 2, which are intended to have an analog output consistent with full-black. If a relatively regular area of white or light gray is being scanned at the chip boundary, a fairly large transition must occur between chip 2-dark pixel 4 to chip 2-(active)pixel 1; if chip 2-pixel 1 does not have time to sufficiently settle before the system moves on to chip 2-pixel 2, a dark streak could occur in the recorded image at the effective boundary between the two chips (i.e. not counting the dark pixel images, which do not appear in the recorded image).

All of the chip-to-chip anomalies of the types discussed above can conceivably be cured by extending the possible settling time for each photosensor before the system begins to read the analog signal from the next photosensor; that is, in a black-to-white transition, sufficient time should be allowed to enable the waveform to reach its "true" value for the particular photosensor. However, to extend the available settling time unduly will clearly have an effect on the input speed of a scanning array. The more time required to "absorb" each pixel of data, the longer it will take to read an entire image, which may include as many as 15 million pixels on a standard-size sheet. The present invention proposes to overcome the problems with chip-to-chip nonuniformities for serial readout channels without seriously impacting the gross input speed of the scanner, by providing means to extend the available settling time only for the first active pixel within each chip in the butted array. In other words, whereas all of the other photosensors in the butted array will be allotted a certain period of time to transfer their signals to the system, the first active pixel in each chip will be allotted an extended period, typically twice the regular period, for settling to a given analog value. Because only a small proportion of all of the photosensors in a full-width array are the first on their chip, only a very small decrease in total operating speed will be required.

As used in the claims herein, the word "set" is used in its basic sense, that is, as a group of one or more photosensors, generally regardless of the configuration of these photosensors on one or more chips. According to any particular design of a full-width scanning array, the channels may be arranged relative to the photosensors and chips so that one channel may involve a plurality of chips, as shown in FIG. 1, or alternately the channels in the complete array may be arranged one chip per channel. Further, conceivably, a plurality of channels may be provided on a single chip. (In one preferred embodiment of the full-width photosensor array incorporating the present invention, there exist, in effect, two "interleaved" arrays, wherein the odd and even photosensors across a single array are respectively routed to separate channels which are later multiplexed to form a single image. In such a configuration, the first two photosensors on a chip, one for a set of odd photosensors and one for a set of even photosensors, are adapted to provide the extended settling period.)

Figure 5:
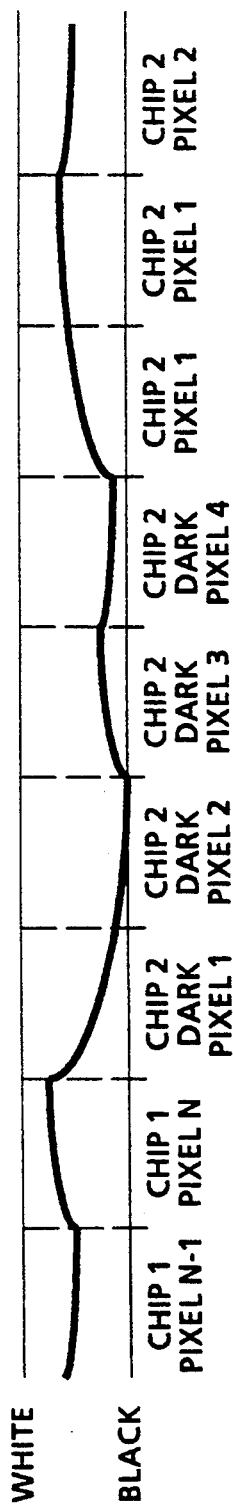
FIG. 5 is an examplary waveform of a readout scheme according to the present invention.

FIG. 5 is an example readout showing the effect of the technique of the present invention on a sample chip having a plurality of dark pixel photosensors associated therewith. The particular readout may be directly compared, for example, with the waveform of FIG. 4. In FIG. 5 there is shown, after the reading of chip 2-dark pixel 4, a "double reading" of chip 2-pixel 1. The photosensor of chip 2-pixel 1 is in effect read out twice, but the important practical effect is that the double readout enables the reading from the particular photosensor to reach a value closer to its asymptotic "final" value by the end of the readout period, which would not necessarily be true if the usual single readout time were allotted, as can be seen in the graph of FIG. 5. At the end of the cycle for the first reading of chip 2-pixel 1, the actual reading of the waveform is slightly different that the reading at the end of the second readout of chip 2-pixel 1. Because of the general trend of the waveform for these two photosensors, it will be apparent that the second reading is a more "true" reading of the image.

Figure 6:
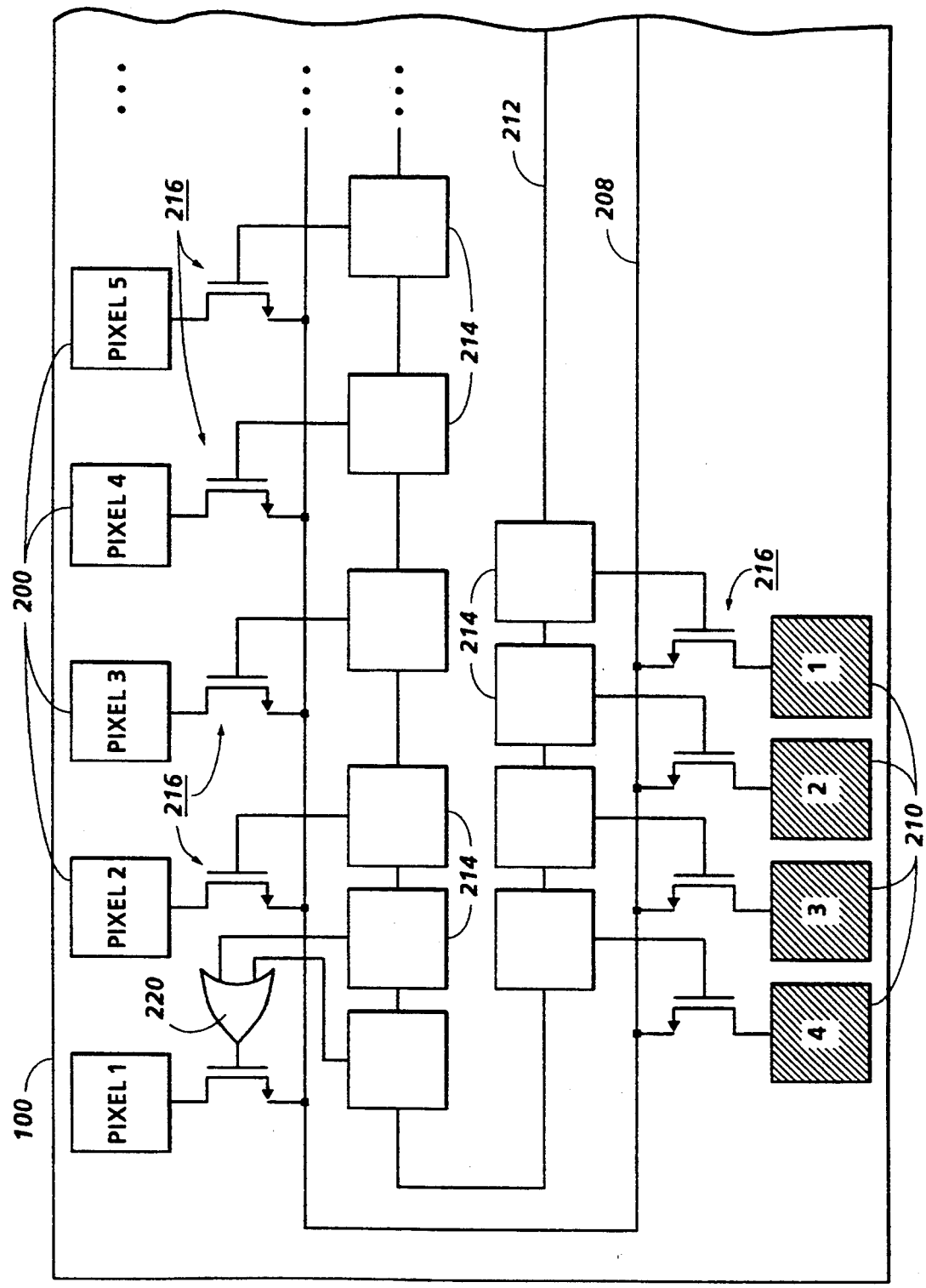
FIG. 6 is a plan view of a single silicon chip of the type used in a raster input scanner.

FIG. 6 is a simplified plan view showing a configuration of photosensors on a single chip 100 as would be found in the linear array 20. A long array of active (i.e., photosensitive) photosensors 200 share a common video line 208 with a plurality of "dark pixel" photosensors, some of which are indicated as 210. Also associated with the photosensors 200 and 210 is a shift register line 212 which connects a series of shift register select switches 214. The shift register select switches 214 have associated therewith a series of transistor switches 216, which, when activated, permit the charge from an individual photosensor 200 or 210 to be read out through the switch 216 onto the common video line 208. There is "run" through the line of shift register switches 214 on line 212 digital information in the form of a string of zeros with a single "1" buried therein. As the string of digits moves through the shift register switches 214 along line 212, the single "1" selectively activates the photosensors in turn as it moves down the input line 212. In the particular design of FIG. 5, the first photosensors to be activated are the dark pixel photosensors 210, followed by the active photosensors 200. As mentioned above, the dark pixel photosensors 210 are typically of the same general structure as the active photosensors 200, except that they are not exposed to light in any way.

As can be seen near active pixel 1 in the Figure, there is provided for active pixel 1 two shift register select switches 214, which are connected by an OR gate 220. It will be apparent that the photosensor for active pixel 1 will be activated when either of the two select switches connected to OR gate 220 are activated. Because the "1" passes through both shift register switches in succession, the practical effect is that the readout time for active pixel 1 is doubled. The illustrated embodiment has been shown to be an effective way of carrying out the technique of the present invention, using a minimum of extra "real estate" on the chip.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. In a raster input scanner having a plurality of sets of active photosensors, a method of reading out signals from the photosensors to a single channel, comprising the steps of:
    for each of a plurality of active photosensors in each set, transferring a signal from the active photosensor to the channel for a predetermined regular readout period; and
    for a first active photosensor to be read out in each set, transferring a signal from the first active photosensor to the channel for an extended readout period which is substantially longer than the regular readout period; and
    where the extended readout period is set to a period of sufficient length so as to allow for the setting of charges in the first active photosensor, and further, where the relative length of the extended readout period with respect to the regular readout period is independent of illumination level.

2. The method of claim 1, further comprising the step of transferring a signal from the first active photosensor in each set first in a predetermined order of reading out signals from the photosensors to the channel.

3. The method of claim 1, wherein the extended readout period is approximately twice the duration of the regular readout period.

4. The method of claim 1, wherein the active photosensors in a set are arranged in a linear array, and the first active photosensor is disposed at one end of the array.

5. The method of claim 1, further comprising the step of reading out signals from the active photosensors associated with each set in the order of the arrangement of photosensors along the array.

6. The method of claim 1, wherein the active photosensors for each set are disposed on a single chip.

7. The method of claim 1, further comprising the step of transferring a signal from a dark pixel photosensor in each set to the channel prior to transferring a signal from the first active photosensor in the set.

8. A raster input scanner, comprising:
    a plurality of sets of active photosensors;
    serial readout means for sequentially reading out signals from the photosensors in each set in a predetermined order; and
    settling means for providing an extended readout period for transferring a signal from a first active photosensor to be read out in each set, the extended readout period being substantially longer than a regular readout period for transferring signals from most other active photosensors in the set; and
    where the extended readout period is set to a period of sufficient length so as to allow for the settling of charges in the first active photosensor, and further, where the relative length of the extended readout period with respect to the regular readout period is independent of illumination level.

9. The scanner of claim 8, wherein the extended readout period is approximately twice the duration of the regular readout period.

10. The scanner of claim 8, wherein the active photosensors in each set are arranged in a linear array, and the first active photosensor is disposed at one end of the array.

11. The scanner of claim 8, wherein the photosensors for each set are disposed on a single chip.

12. The scanner of claim 8, comprising a plurality of chips, each chip having a plurality of active photosensors constituting a set of active photosensors thereon.

13. The scanner of claim 8, wherein each set further comprises at least one dark pixel photosensor, and the serial readout means transfers a signal from the dark pixel photosensor prior to transferring a signal from the first active photosensor in the set.

14. The scanner of claim 8, wherein:
    the serial readout means includes a shift register input line having a plurality of shift register select switches operatively disposed thereon, each shift register select switch being operatively connected to one active photosensor, and
    the settling means includes an extra shift register select switch on the shift register input line operatively connected to the first active photosensor in the set.

* * * * *